Aug. 14, 1934.  G. G. BUCKLAND  1,970,075
COMBINATION STOVE AND HEATER
Filed April 29, 1931
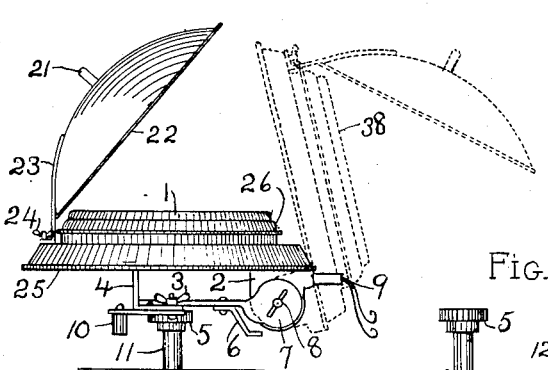
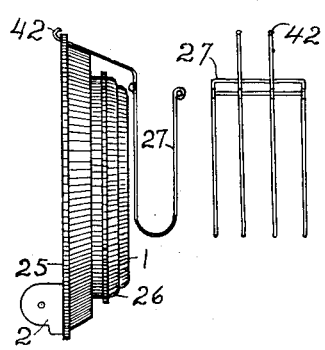
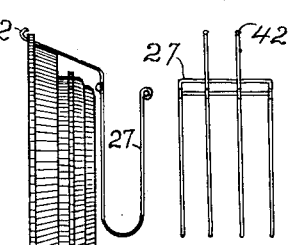
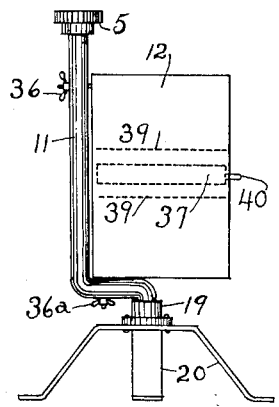
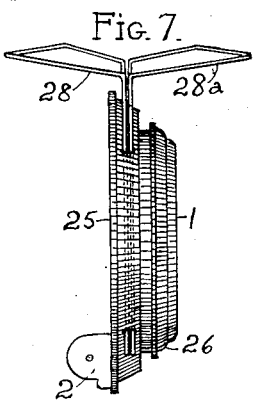
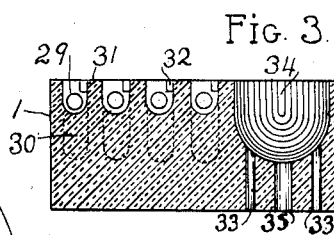
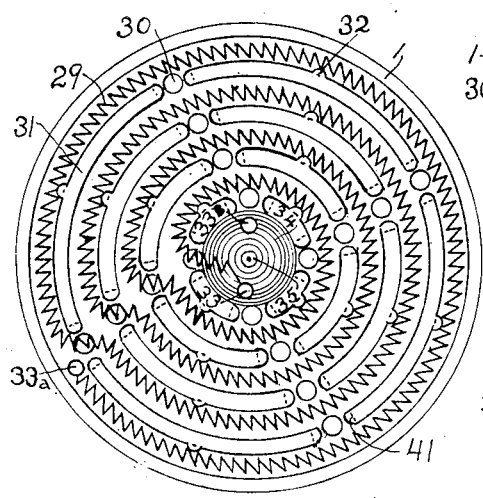
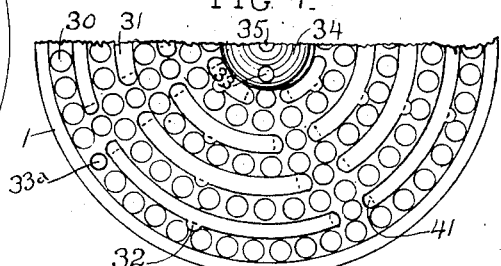
George Gardner Buckland,
INVENTOR
by Lester L. Sargent, Atty.

UNITED STATES PATENT OFFICE 1,970,075

COMBINATION STOVE AND HEATER

George Gardner Buckland, San Francisco, Calif.

Application April 29, 1931, Serial No. 533,825

3 Claims. (Cl. 219—37)

The object of my invention is to provide a novel electric combination stove and heater; and to provide attachments for such a device capable of many adjustments. I attain these and other objects of my invention by the apparatus illustrated in the accompanying drawing, in which Figure 1 is a side elevation of a complete apparatus, except the toaster grid and clothes dryer, with the bowl reflector in place;

Fig. 2 is a top plan view of the heater element, the air pockets being omitted for clearness;

Fig. 3 is a sectional view of the element in which the air pockets are shown by dotted lines indicated at 30;

Fig. 4 is a plan view of one half of the element without the resistor wire; in this view the air pockets being shown, and the resistor wire being omitted for clearness;

Fig. 5 is a side view of the oven and supporting stand.

Fig. 6 is a side view of the stove showing the toaster grid attachments 27 in place, member 26 being simply a mounting to receive the element.

Fig. 7 is a side view of the stove with the clothes dryer rods in place, element 1 being mounted in the metal 26 by a center bolt not indicated; and Fig. 8 is a plan view of the toaster grid.

Referring to the accompanying drawing and especially to Fig. 1, I provide a stove electric element 1, mounted on a hinge, said hinge being cast integral with the stove frame 25. I provide a thumb nut 3 holding the angle-iron stove-supporting frame 4 to the stand flange 5 on top of the stand frame 11, which in turn rests on the feet 20.

I provide a stove foot 6 and two stove feet 10 spaced at regular intervals to support the stove as a table stove, or as a floor heater when removed from the stand 11 by loosening the thumb nut 3.

I provide an arm 7 which has a double function, namely that of hinge and of stove supporting arm, i. e., it is a projecting arm. At one end it is riveted to angle bar 4 and projects at a right angle, the outer end forming the other half of the hinge which enables the stove to be tilted as shown by the dotted lines 38 shown in Fig. 1. It may be held at the desired angle by means of thumb nut 8.

I provide a toaster grid 27, bowl reflector 22, and clothes dryer rods 28, 28a. Any one of these attachments or all of them may be attached at the same time at pleasure. The bowl reflector 22 with its arm 23 is adjustable by means of thumb nut 24 with respect to the frame of the stove 25. The stove frame 25 is made round, having convenient holes in its circumference to receive the toaster grid, the bent ends 42 being readily hooked into and through the holes in the outer edge of the stove, the clothes drying rods, and the bowl reflector. The toaster grid is made of four or more wires into a rectangle form and then bent double to receive bread; and with its arms 42 bent at their ends in hook form, as shown in Fig. 8, is adjustably placed in two convenient holes in the edge of the stove frame 25; and may be used as a guard when the stove is tilted vertically or even in use horizontally, or when used as a floor heater or as a table heater. The heating element is fed with current from an outside source by means of a plug-in switch 9.

When using the device for a room air-heater the best results are obtained by placing the stove in an almost vertical position with the bowl reflector attached. The toaster grid may be left on as a guard over the electric element. I provide an oven 12 which is simply a rectangular sheet-metal oven, having a door 13, hinges 18, and door handle 17. The oven is attached to the stand 11 by means of thumb nuts 36, 36a, and may be quickly removed. I provide two small slide mica doors 14, 14a. These mica doors meet together as shown at 15, having two semi-circular holes cut in each door for the purpose of receiving the plug-in pins 40 of the oven element 37, which rest adjustably upon shelf cleats 39—39. These cleats are on the inside walls of the oven and are simply the regulation cleats used in all stoves whether wood-burning or gas or electric stoves. For brevity the draftsman has shown only a few cleats.

The element 37 may be set at the desired height on the cleats, the pins being long enough to project through the openings 15. It will be noticed by this arrangement the mica slides may be moved up or down to suit the height of the element inside the oven. After adjustment the stove may be connected to the electric current by means of a plug-in switch which may be placed on the projecting pins 40. The mica slides also become handy windows for observing the progress of the cooking. It will be noted that the plug-in switch will be removed when it is desired to open the oven door.

Figs. 2, 3 and 4 give a general idea of the electric element. The body of the element is made of refractory asbestos material with circumferential channels having ridges between them. These ridges are made in convenient sections for winding the resistor 29 with hook ends and holding tits 32. This construction allows the constructing electrician to vary the winding in many different forms. (One form only of winding is shown in this instance). The inner end of the resistor is held in bolt hole 33 or hole 33B, while the outer end terminates at 33a. In the center of the element is shown a large air pocket 34 made with a paraboloidal bottom for projecting the hot air outwardly. Hole 35 is for bolting the element to the stove frame 25. At 30 in Figs. 2 and 4, and by dotted lines 30 in Fig. 3, are shown a large number of air pockets beneath the resistor wire in the channels 29 to add to or increase the air-heating space of the element.

In Fig. 7 is shown the method of attaching adjustably the bent clothes-drying supporting rods 28, 28a, the ends of which are slipped downwardly through the stove frame 25, there being convenient holes for the same. At 42, in Figs. 6 and 8, is shown the means for attaching the toaster grid 27 to the stove frame 25; the bent ends of the projecting grid arms being slipped in the holes in the stove frame 25. The bowl reflector is composed of sheet-metal made in bowl form for projecting the heat, and hovers close to the electric element. It is capable of many adjustments.

What I claim is:

1. In a combination stove and heater, a heater element having spaced channels to increase the air heating space of the element and having a resistor wire disposed in said channels, and having air pockets in the heater element immediately beneath the resistor wire, said air pockets being in the bottom of the channels.

2. In an electric stove and heater, a bowl-shaped reflector, an electrically heated stove plate, an arm on the bowl shaped reflector adapted to be readily attached to or detached from the edge of the electrically heated stove plate, a thumb screw constituting the attaching means, the bowl reflector having its concave side hovering over the electric element of the stove.

3. In a combination stove and heater, a heater element having a channel to increase the air heating space of the element, a resistor wire disposed in said channel, and a multiplicity of closely spaced air pockets formed in the air channel and extending downwardly into the heating element beneath the resistor wire.

GEORGE GARDNER BUCKLAND.